(12) United States Patent
Voorhies et al.

(10) Patent No.: US 11,760,574 B2
(45) Date of Patent: Sep. 19, 2023

(54) SYSTEMS AND METHODS FOR CONTROLLING ORDER FULFILLMENT USING SPATIAL BATCHING

(71) Applicant: inVia Robotics, Inc., Westlake Village, CA (US)

(72) Inventors: Randolph Charles Voorhies, Sherman Oaks, CA (US); Daniel Frank Parks, II, Los Angeles, CA (US); Lior Elazary, Agoura Hills, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 371 days.

(21) Appl. No.: 17/193,059

(22) Filed: Mar. 5, 2021

(65) Prior Publication Data

US 2022/0281687 A1 Sep. 8, 2022

(51) Int. Cl.
| | | |
|---|---|---|
| G06F 7/00 | (2006.01) | |
| B65G 1/137 | (2006.01) | |
| B65G 1/04 | (2006.01) | |

(52) U.S. Cl.
CPC ......... *B65G 1/1378* (2013.01); *B65G 1/0492* (2013.01); *B65G 2203/0233* (2013.01); *B65G 2209/02* (2013.01)

(58) Field of Classification Search
CPC .............. B65G 1/1378; B65G 1/0492; B65G 2203/0233; B65G 2209/02; B65G 1/1371
USPC ......................................... 700/213–216, 228
See application file for complete search history.

(56) References Cited

U.S. PATENT DOCUMENTS

2017/0046644 A1* 2/2017 Zhang ................ G06Q 30/0635

* cited by examiner

*Primary Examiner* — Yolanda R Cumbess
(74) *Attorney, Agent, or Firm* — Ansari Katiraei LLP; Arman Katiraei; Sadiq Ansari

(57) ABSTRACT

An order fulfillment system controller receives orders for different objects, generates a number of batched tasks that is less than the number of received orders, and determines a set of the orders with a total distance between them that is greater than a total distance between other sets of the orders. The controller allocates a different order from the set of order to a different batched task, and allocates each unallocated order to a selected batched task based on the distance between objects of the unallocated order and objects previously allocated to the selected batched task being less than the distance between objects of the unallocated order and objects previously allocated to other batched tasks. The controller controls different agents according to the allocation of different subsets of orders to different batched tasks.

19 Claims, 10 Drawing Sheets

SYSTEMS AND METHODS FOR CONTROLLING ORDER FULFILLMENT USING SPATIAL BATCHING

BACKGROUND

An order fulfillment system may coordinate and control the manner by which customer orders are fulfilled. The order fulfillment system may direct and/or control the sequence with which different objects stored within a site are retrieved, packed, and/or otherwise used to complete different orders. This level of control exerted by the order fulfillment system may directly correlate to the overall efficiency and/or productivity of the site as well as the overall efficiency and/or productivity of the various agents operating within the site under the direction or control of the order fulfillment system.

The order fulfillment system may decrease the efficiency and/or productivity of the site by providing a suboptimal assignment of tasks and exerting suboptimal control over the agents. For example, the order fulfillment system may direct a single agent to fulfill a first order at a first end of the site, fulfill a second order at an opposite end of the site, and fulfill a third order at the first end of the site. This is an example of a suboptimal assignment of tasks and performing a suboptimal control of the agent as traveling distance is unnecessarily increased leading to fewer tasks or orders being completed in a given amount of time. Yet, some conventional order fulfillment systems operate in this suboptimal manner by fulfilling orders sequentially as each order is received without regard for where ordered objects are located or the order sequence having other inefficiencies.

DETAILED DESCRIPTION OF PREFERRED EMBODIMENTS

The following detailed description refers to the accompanying drawings. The same reference numbers in different drawings may identify the same or similar elements.

Provided are systems and methods for controlling order fulfillment in a site using spatial batching. The spatial batching may reorder the sequencing with which different orders are fulfilled in order to the increase the rate of order fulfillment within a site.

In some embodiments, the systems and methods may include a controller that operates as part of an order fulfillment system and/or that controls the fulfillment of orders. The controller may receive a set of orders for a plurality of different objects in a first sequence. Each order may specify a grouping or bundling of two or more objects. The controller may perform the spatial batching to generate a set of batched tasks and a second sequence with which to fulfill the orders based on the relative spatial positioning of the ordered objects within a site. The generated set of batched tasks and the second sequence with which to fulfill the received order may minimize the total distance associated with retrieving entire orders with different agents relative to the first sequence at which the orders are received without dividing or splitting orders (e.g., the retrieval of different objects for the same order) between different agents. In other words, the controller, via the spatial batching, may optimize order fulfillment workflows and/or operations by controlling different agents to retrieve all objects of different orders in a modified sequence that minimizes the total distance traveled and total work performed by each agent.

Figure 1:
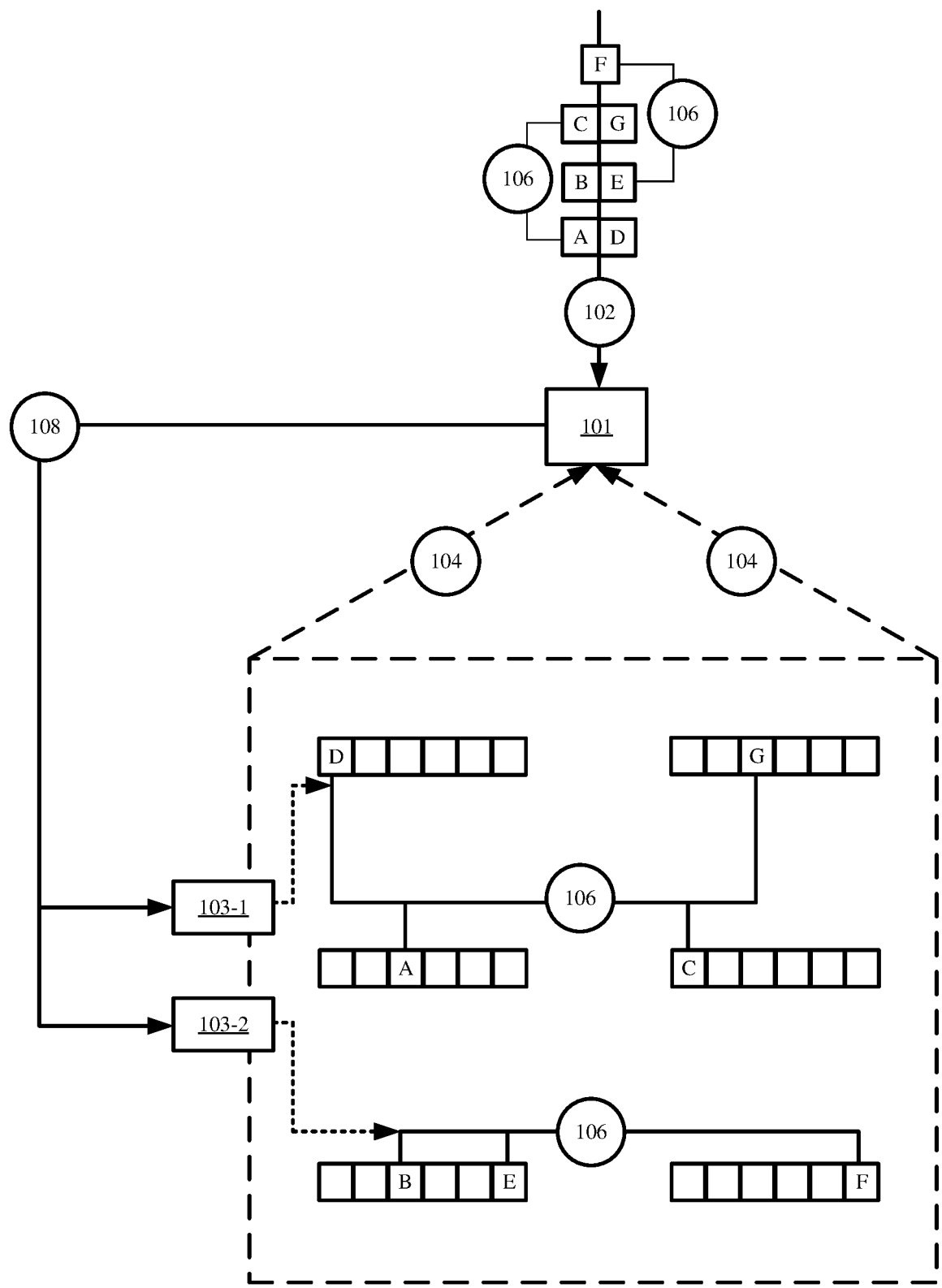
FIG. 1 illustrates an example of fulfilling orders based on an out-of-order sequencing that is defined from spatially batching the ordered objects in accordance with some embodiments presented herein.

FIG. 1 illustrates an example of fulfilling orders based on an out-of-order sequencing that is defined from spatially batching the ordered objects in accordance with some embodiments presented herein. FIG. 1 may include controller 101 that controls order fulfillment within a site and/or the operation of at least two different agents 103-1 and 103-2 (herein sometimes collectively referred to as "agents 103" or individually as "agent 103") that operate within the site. Controller 101 and agents 103 may form or be part of an order fulfillment system.

Controller 101 may receive (at 102) a plurality of orders in a first sequence. The first sequence may correspond to the sequence by which customers place each order of the plurality of orders, each order is routed to the order fulfillment system, and/or each order is created within the order fulfillment system. An order may include a single object or a grouping of two or more objects. The grouping of objects may be specified by a customer, the order fulfillment system, and/or any service, system, or user that interfaces with controller 101. Accordingly, an order may include a customer order for requested objects, a system order for replenishing or checking inventory in the site, an order to facilitate the manufacturing of different goods, and/or other groupings of objects within the site. In each case, the order may include bundling multiple different items and/or objects from different locations within a warehouse, and controller 101 may control the bundling to ensure that the two or more items and/or objects are picked, retrieved, and/or transferred by a single agent 103 to avoid inefficiencies from aggregating items and/or objects of the same order that are retrieved by different agents 103.

The objects of each order may be stored within the site at nonconsecutive and/or non-neighboring storage locations as shown in FIG. 1. The objects may be stored at different storage locations on different racks within the site. As shown in FIG. 1, a first order may include objects "A" and "D", and a second order may include objects "B" and "E".

Controller 101 may determine (at 104) the storage location or position of each ordered object. In some embodiments, controller 101 may store or obtain a mapping that identifies the storage locations for different objects or inventory contained within the site.

Controller 101 may perform (at 106) the spatial batching to define a second sequence, that is different than the first sequence, for retrieving the objects of each order with one of agents 103, wherein the second sequence reduces the total distance agents 103 travel in order to fulfill the received (at 102) orders relative to the first sequence and/or other sequencing for the orders. In some embodiments, controller 101 may define the second sequence by batching different orders into one of two batched tasks based on a total sum of the minimum distance between the objects of the orders assigned to one of the two batched tasks. In other words, controller 101 may compute the sum of the minimum distance from all objects of a first order to each object of a second order assigned to a first batched task and to each object of a third order assigned to a second batched task, may assign the first order to whichever object assigned to the first batched task or the second batched task resulted in the least total distance, and may define the second sequence to minimize the total distance and/or separation between the objects of the orders assigned to a common batched task.

Controller 101 may control (at 108) and/or direct each agent 103 to retrieve the ordered objects according to the second sequence defined as a result of the spatial batching. In some embodiments, agents 103 may include one or more robots or human workers. Controller 101 may control (at 108) the robots by activating or deactivating different actuators of the robots and/or by issuing different commands or instructions that direct the movements of the robots and the picking or retrieval of the ordered objects according to the second sequence. Controller 101 may control (at 108) the human workers by controlling handheld or mobile devices carried by each human worker. In particular, controller 101 may provide different messaging to the mobile devices. The messaging may modify user interfaces or displays of the mobile device, and may direct the operation of the human workers in performing tasks according to the second sequencing and spatial batching of the ordered objects.

As shown in FIG. 1, controller 101 may control (at 108) first agent 103-1 according to the spatial batching assigning objects "A" and "D" from a first order and objects "C" and "G" of a second order to a first batched task based on the total minimum distance between the objects of the first and third orders being less than pairings of other orders, and defining an out-of-order second sequence of objects "D", "A", "C", and "G" with which first agent 103-1 fulfills the first and third orders in the least amount of time and/or total distance. Similarly, controller 101 may control (at 108) second agent 103-2 according to the spatial batching assigning objects "B" and "E" from a second order and object "F" of a fourth order to a second batched task based on the total minimum distance between the objects of the second and fourth orders being less than pairings of other orders, and defining an out-of-order second sequence of objects "B", "F", and "E" with which second agent 103-2 fulfills the second and further orders in the least amount of time and/or total distance. Accordingly, first agent 103-1 and second agent 103-2 may transfer, under direction and/or control (at 108) of controller 101, the retrieved objects to a packing station, shipping station, and/or other destination where each order may be finalized for ultimate delivery to the customer. It is important to note that the spatial batching optimizes the operation of agents 103 and overall order fulfillment by assigning entire orders (e.g., all objects of a single order) to one agent 103 in a manner that reduces the work performed by agents 103 to fulfill all received (at 102) orders while avoiding additional tasks for aggregating objects retrieved by different agents 103 if the objects of an order were split between different agents 103.

Controller 101, by implementing the spatial batching, may provide an improved out-of-order retrieval and/or order fulfillment that is based on the positioning or storage locations of all objects in one order and individual objects of other orders rather than the sequence or timing with which the orders are received (at 102) by controller 101. Consequently, the productivity of agents 103 may improve when operating under the direction and/or control of controller 101 as opposed to allowing agents 103 to retrieve the ordered objects in any sequence of their own choosing or in the first sequence with which the orders arrive at the order fulfillment system.

Controller 101 and/or systems and methods that implement the spatial batching set forth herein have shown up to a 40% increase in the number of fulfilled orders in a given time relative to conventional order fulfillment systems that retrieve objects based on the sequence in which the objects are ordered or requested from the system. In other words, controller 101 and/or the systems and methods that implement the spatial batching may control agents 103 in completing up to 40% more tasks in a given shift or period of time versus agents that are not controlled by controller 101 or agents that are controlled using conventional sequential order of operation.

Figure 2:
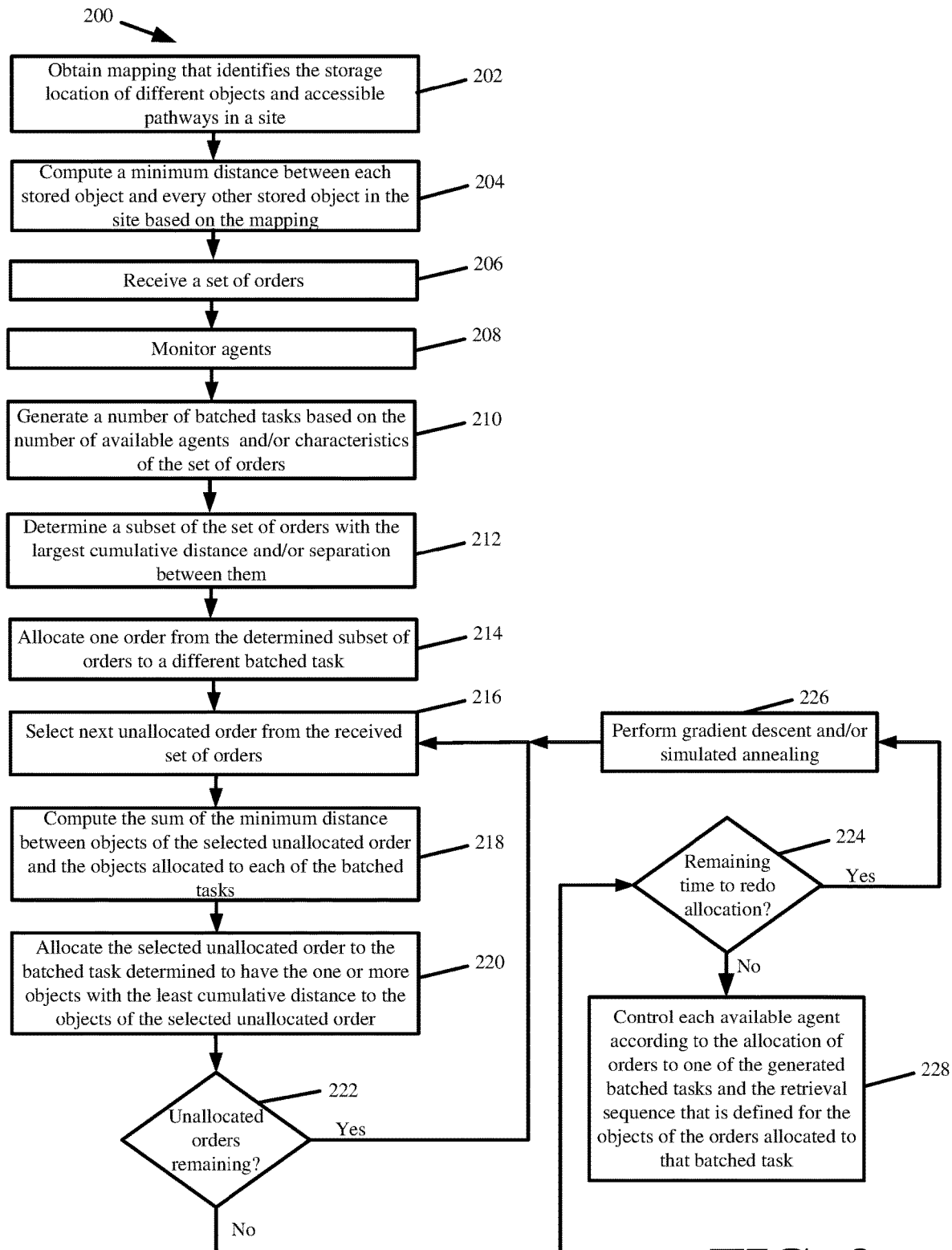
FIG. 2 presents a process for performing the spatial batching and controlling the operation of agents according to the spatial batching in accordance with some embodiments presented herein.

FIG. 2 presents a process 200 for performing the spatial batching and controlling the operation of agents according to the spatial batching in accordance with some embodiments presented herein. Process 200 may be executed by controller 101.

Process 200 may include obtaining (at 202) a mapping that identifies the storage location and/or spatial location of different objects in a site. The mapping may be generated based on messaging collected from or provided by agents 103. For instance, as a particular agent 103 places a particular object in a particular storage location, the particular agent 103 may scan a first identifier that identifies the particular object and a second identifier that identifies the particular storage location. The particular agent 103 may wirelessly transmit the first identifier and the second identifier to controller 101, and controller 101 may update the mapping to include the particular object at the particular storage location, and may further update the mapping based on other object-to-storage location information provided by other agents 103. The mapping may further identify accessible pathways by which agents 103 may move from one storage location to another storage location. The accessible pathways may include aisles, hallways, walkways, ladders, elevators, lifts, and/or physical resources or spaces for moving between different storage locations.

Process 200 may include computing (at 204) a minimum distance between each stored object and every other stored object in the site based on the mapping. The computation (at 204) may be performed once, during the start of every shift, and/or whenever the storage location for an object changes. The results of the computation (at 204) may be stored within memory or storage of controller 101. In some embodiments, controller 101 may store the computed minimum distances in a matrix or other data structure that may be indexed for rapid lookup of the minimum distance between any two storage locations or objects.

Process 200 may include receiving (at 206) a set of orders. Controller 101 may receive (at 206) the set of orders from an ordering interface (e.g., an ecommerce website), an ordering component of the order fulfillment system, different customer devices, or from an external device or system. Each order from the set of orders may include one or more objects that are stored at neighboring or non-neighboring storage locations. The objects may include products, goods, or other items that are stored within the site, and that may be shipped, delivered, picked-up, or otherwise transferred to a customer or buyer. The objects may have different sizes, shapes, features, weights, and/or other characteristics.

The number of orders included with the received (at 206) set of orders may change as demand changes. For instance, controller 101 may run at five-minute intervals, and may receive (at 206) five new orders during a first five-minute interval, and may receive (at 206) eleven new orders during a second five-minute interval.

Process 200 may include monitoring (at 208) agents 103 within the site. Monitoring (at 208) may include determining agent 103 availability, location, state, performance, and/or other agent characteristics. Controller 101 may monitor (at 208) agents 103 via wireless signaling that controller 101 exchanges with radio transceivers of autonomous robots and/or wireless devices that are carried by human workers. In particular, the monitoring (at 208) may include detecting a position of each agent 103 to determine if an agent 103 is idle or engaged in executing an assigned task or operation, determining whether one or more tasks previously assigned to an agent 103 are still pending with that agent 103, and/or tracking completed operations or actions by each agent 103 via the wireless messaging exchanged with agents 103. In some embodiments, agent 103 availability is not limited to agents 103 that are idle (e.g., no assigned tasks to perform), and may include any agent 103 within the site that is active and/or operational even if the agent 103 is engaged in completing a prior set of assigned tasks or operations.

Process 200 may include generating (at 210) a number of batched tasks based on the number of available agents 103 as determined from the monitoring (at 208). For instance, if controller 101 detects three available agents 103, controller 101 may generate three different batched tasks to divide the total work associated with fulfilling the received (at 206) set of orders and/or to create one batched task for each available agent 103.

In some embodiments, generating (at 210) the number of batched tasks may be based on the number of ordered objects within the received (at 206) set of orders and/or characteristics (e.g., size, shape, weight, etc.) of the ordered objects. For instance, controller 101 may base the batched task generation (at 210) on the number of ordered objects and/or object characteristics to maximize the number of orders that each agent 103 fulfills and/or completes during a tour or pass through the site. For instance, each agent 103 may retrieve up to five objects during a single tour of the site. Controller may receive three orders for a total of ten objects, and may detect three available agents 103. Rather than divide the ten objects into three batched tasks (e.g., one batched task for each of the three available agents 103), controller 101 may maximize the amount of the work performed by each agent 103 by generating two batched tasks with a first of the two batched tasks including one or more of the orders with a first half of the ten objects, and with a second of the two batched tasks including one or more of the orders with a second half of the ten objects, and by assigning the batched tasks to two agents 103.

Process 200 may include determining (at 212) a subset of the received (at 206) set of orders with the largest cumulative distance and/or separation between them. The determination (at 212) may include computing the sum of the maximum distance between the objects of one particular order and each object of other orders, and selecting the subset of orders with the largest cumulative distance between them. In some embodiments, controller 101 may reference the storage location mapping and/or minimum distance computations to compute the sum of the maximum distance between different orders. The number of orders in the subset of orders may be equal to the generated (at 210) number of batched tasks. For instance, if controller 101 generates three batched tasks, controller 101 may determine (at 212) the three orders from the received (at 206) set of orders that have the largest cumulative distance and/or separation between them.

Process 200 may include allocating (at 214) one order from the determined (at 212) subset of orders to a different batched task. Allocating (at 214) an order to a batched task may include entering a first identifier of that order to the batched task, and/or second identifiers that correspond to the storage locations for the objects of that order. The allocation (at 214) may therefore associate a first order to each batched task.

Process 200 may then continue to assign the remaining unallocated orders to the batched tasks in a manner that reduces the total cumulative distance and/or work between the orders and/or objects of each batched task, thereby minimizing the cumulative distance and/or work that an agent performs in order to complete or fulfill the orders that are allocated to a particular batched task. Accordingly, process 200 may include selecting (at 216) a next unallocated order from the received (at 206) set of orders (e.g., an order from the set of orders that has not yet been assigned or allocated to one of the batched tasks). In some embodiments, controller 101 may randomly select (at 216) the next unallocated order.

Process 200 may include computing (at 218) the sum of the minimum distance between objects of the selected (at 216) unallocated order and the objects that have been allocated to each of the batched tasks. From computing (at 218) the sum of the minimum distance, controller 101 may determine which of the batched tasks includes one or more objects with the least cumulative distance to the objects of the selected (at 216) unallocated order.

Process 200 may include allocating (at 220) the selected (at 216) unallocated order to the batched task that is determined to have the one or more objects with the least cumulative distance to the objects of the selected (at 216) unallocated order. The allocation (at 220) may include defining a retrieval sequence for the ordered objects that are allocated to a particular batched task, wherein the retrieval sequence may minimize the total distance to fulfill the orders allocated to the particular batched task and/or may minimize the total distance between the storage locations of the ordered objects that are allocated to the particular batched task.

In some such embodiments, the allocation (at 220) may be adjusted when a batched task reaches a full state. The full state may be reached when the number of orders and/or objects of the orders allocated to a particular batched task satisfy and/or exceed a capacity threshold. The capacity threshold may correspond to a total number of orders and/or objects that an agent 103 may retrieve during a single pass or tour through the site. The full state may be determined based on the capabilities of available agents 103 and/or properties (e.g., size, shape, weight, etc.) of the objects allocated to the particular batched task. For instance, each agent 103 may be capable of retrieving ten objects during a single pass or tour through the site, and a batched task may reach the full state when the number of objects from orders allocated to that batched task nears or exceeds ten. Once the particular batched task reaches the full state, an unallocated order may not be allocated to that particular batched task despite the sum of the minimum distance computation (at 218) identifying that particular batched task as having one or more objects with the least cumulative distance to objects of the unallocated order. In such cases, controller 101 may allocate (at 220) the unallocated order to another batched task that has not reached the full state and that includes one or more allocated objects with the next least cumulative distance to the objects of the unallocated order.

After allocating (at 220) the selected unallocated order, process 200 may include determining (at 222) the received (at 206) set of orders include one or more orders that have yet to be allocated to one of the batched tasks. In response to determining (at 222—Yes) that one or more unallocated orders remain, process 200 may include selecting (at 216) the next unallocated order, computing (at 218) the sum of the minimum distance between the objects of unallocated order and objects allocated to the different batched tasks, and allocating (at 220) the unallocated order to one of the batched tasks based on the sum of the minimum distance computation (at 218). In response to determining (at 222—No) that all orders have been allocated to one of the batched tasks, process 200 may include determining (at 224) whether there is remaining time within a time buffer with which controller 101 may redo the spatial batching and/or the order-to-batched task allocation for the received (at 206) set of orders.

In response to determining (at 224—Yes) that there is remaining time within the time buffer to redo the spatial batching for the received (at 206) set of orders, process 200 may include performing (at 226) a gradient descent and/or simulated annealing to determine if a different order-to-batched task allocation exists that provides a more efficient retrieval sequencing than the current allocation. Specifically, controller 101 may store the current order-to-batched task allocation, may reset the batched tasks to include a first order after the initial allocation based on the sum of the maximum distance between the orders, may select the unallocated orders in a different sequence to allocate to the batched tasks, and may compare the new allocation to the stored allocation to determine if the new allocation better optimizes fulfillment of the received (at 206) set of orders by reducing the total distance to fulfill the set of orders relative to the stored allocation.

For instance, controller 101 may perform process 200 and the spatial batching for new sets of orders at five-minute intervals. Controller 101 may complete a first allocation of order from a current set of orders to a set of batched tasks in one minute, may determine additional allocations of the orders to the set of batched tasks within the remaining four minutes, and may select the allocation with the least total amount of work or shortest overall distance to fulfill the current set of orders. For instance, the first allocation may begin the allocation of unallocated orders to the set of batched tasks with a first randomly selected order followed by a second randomly selected order, and a second allocation may begin with the allocation of unallocated orders to the set of batched tasks with a third randomly selected order followed by a fourth randomly selected order. The different sequence by which the unallocated orders are allocated based on their minimum distance to objects that have been allocated to one of the batched tasks may produce different allocations and batched tasks that have different total distances or work required to fulfill the current set of orders.

In response to determining (at 224—No) that there is no remaining time within the time buffer to redo the spatial batching for the received (at 206) set of orders, process 200 may include controlling (at 228) each available agent 103 according to the allocation of orders to one of the generated batched tasks and the retrieval sequence that is defined for the objects of the orders allocated to that batched task. Controlling (at 228) agents 103 may include assigning a different batched task to a different agent 103, and operating and/or directing a particular agent 103 to retrieve the ordered objects that are allocated to a particular batched task according to the sequence that is defined for those ordered objects in the particular batched task.

Figure 3:
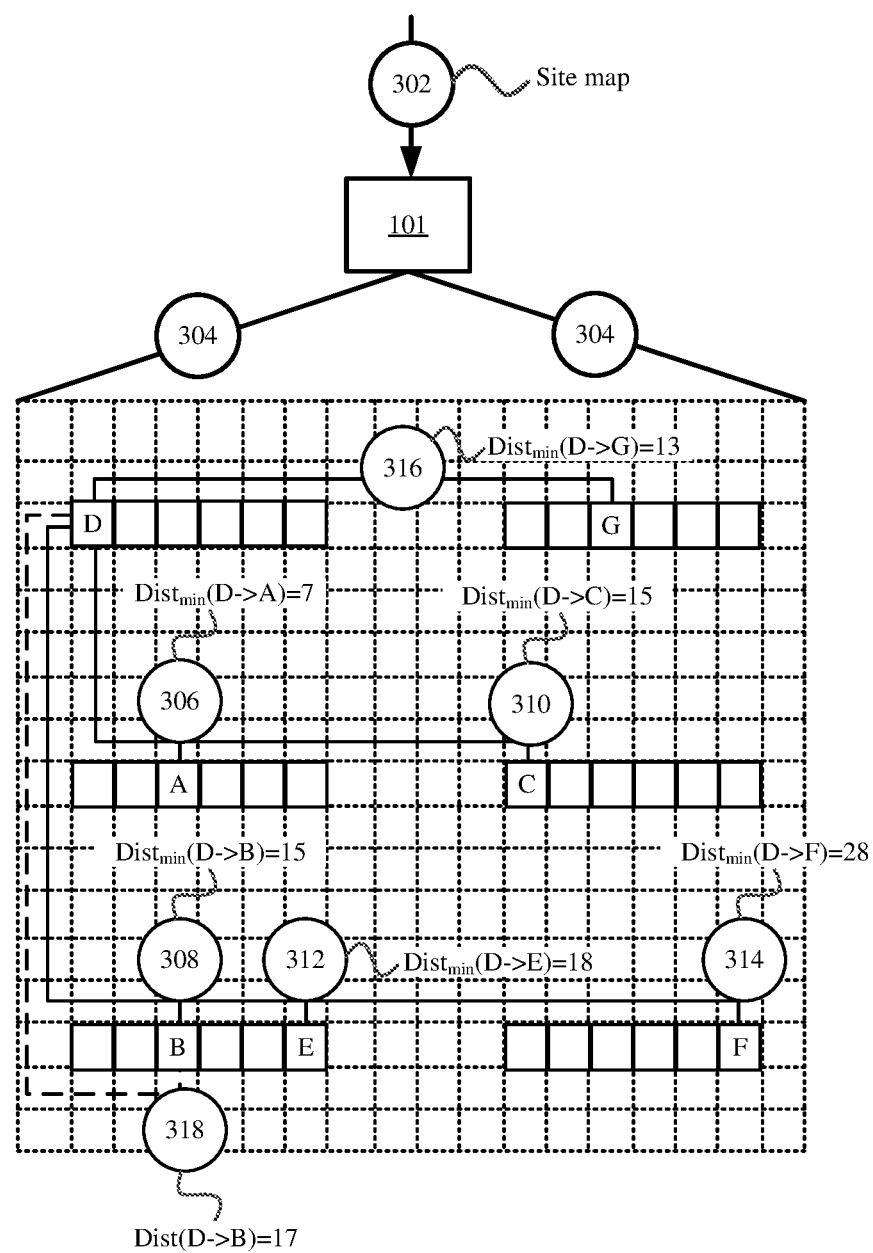
FIG. 3 illustrates an example mapping of object storage locations within a site, and computing the minimum distance between each object and other objects based on the mapping in accordance with some embodiments presented herein.

FIG. 3 illustrates an example mapping of object storage locations within a site, and computing the minimum distance between each object and other objects based on the mapping in accordance with some embodiments presented herein. Controller 101 may obtain (at 302) a digital representation that maps a physical layout of a site. In particular, the digital representation may identify different objects at their corresponding storage locations within the site.

Controller 101 may quantize and/or parameterize (at 304) the digital representation and/or mapping of the site. Quantizing (at 304) the mapping may include dividing the mapping into precomputed regions. The precomputed regions may correspond to uniform or non-uniform sized and/or shaped sections. Parameterizing (at 304) the mapping may include partitioning the mapping and/or digital representation of the site into a grid of equal or different sized sections. Each section may correspond to a particular amount of space or distance (e.g., one meter). The quantization or parameterization (at 304) may further identify regions or sections through which an agent 103 may pass or travel through and/or regions or sections that are not obstructed by a barrier or other obstructions.

Controller 101 may compute the minimum distance between each object and every other object based on the minimum of number of sections that separate one object from the other objects. FIG. 3 illustrates computing (at 306, 308, 310, 312, 314, and 316) the minimum distance from object "D" to every other object (e.g., objects "A", "B", "C", "E", "F", and "G") in the site. For instance, controller 101 may compute (at 318) a first path and/or distance between objects "D" and "B", may compute (at 308) an alternative second path and/or distance between objects "D" and "B", and may determine that the second path and/or distance is less than the first path and/or distance. Accordingly, controller 101 may retain the computation (at 308) for the second path and/or distance as the minimum distance between objects "D" and "B".

Controller 101 may compute the minimum distances between the stored objects before performing the spatial batching so that the minimum distances may be readily available and accessible via rapid lookups when performing the spatial batching. In some embodiments, controller 101 may store the computed minimum distances between different objects in a distance matrix or other data structure that may be indexed.

Figure 4:
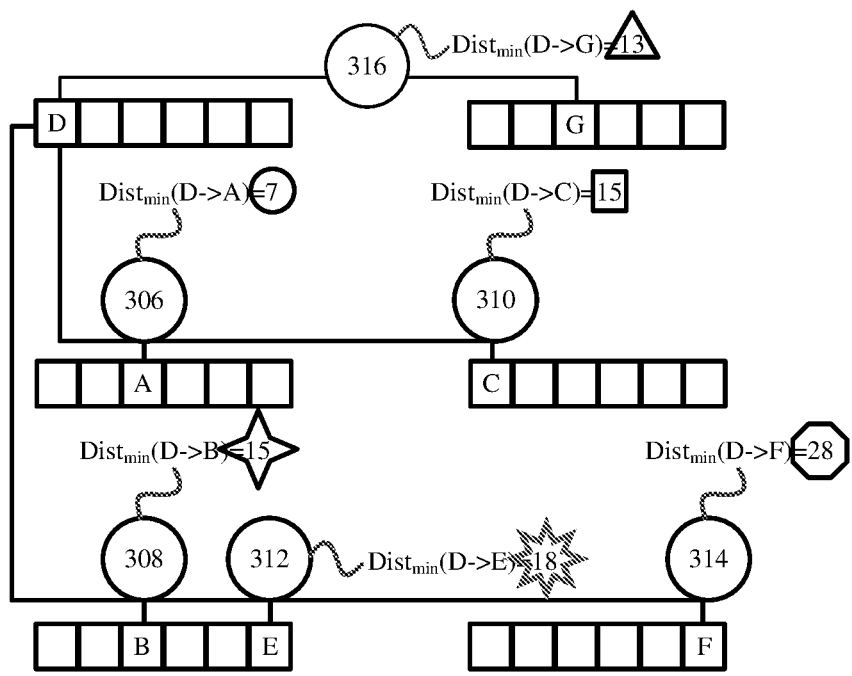
FIG. 4 illustrates example distance matrix that indexes and stores the computed minimum distances between a set of stored objects in accordance with some embodiments presented herein.

FIG. 4 illustrates example distance matrix 400 that indexes and stores the computed minimum distances between a set of stored objects in accordance with some embodiments presented herein. Distance matrix 400 may be generated based on the parameterized mapping illustrated in FIG. 3.

The minimum distance between any two stored objects may be quickly accessed by using identifiers of the two stored objects as indices into distance matrix 400. For instance, the indices (B, A) may identify a minimum distance of 5 separating the storage locations of objects "B" and "A".

In some embodiments, distance matrix 400 may be stored as a two-dimensional array. In some embodiments, distance matrix 400 may include one or more database tables that are indexed based on the object identifiers. An object identifier may include any value that differentiates an object from other objects and/or the storage location of one object from the storage location of other objects. The object identifier may include a bar code, fiducial, and/or another salient queue. The object identifier may be present on the object and/or storage location of the object, and may be scanned using a scanner, camera, and/or other device of agents 103.

Figure 5:
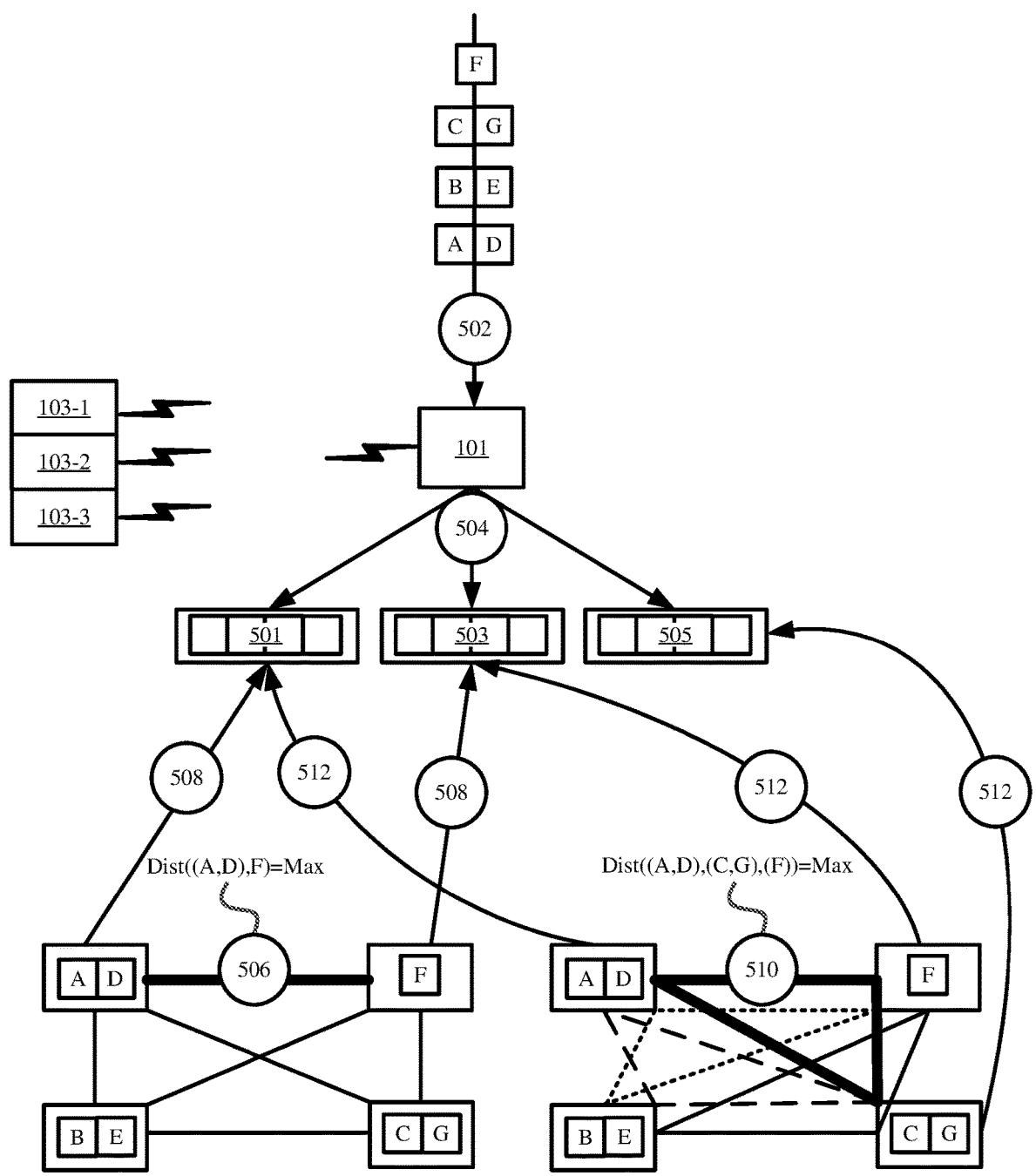
FIG. 5 illustrates an example for generating batched tasks and allocating a different first object to each batched task in accordance with some embodiments presented herein.

FIG. 5 illustrates an example for generating batched tasks and allocating a different first order to each batched task in accordance with some embodiments presented herein. Upon receiving (at 502) a set of orders for a plurality of objects, controller 101 may generate (at 504) a batched task for each available agent 103. In some embodiments, controller 101 may condition the number of batched tasks that are generated (at 504) to maximize agent productivity. In particular, controller 101 may determine the maximum number of objects that each agent 103 may retrieve during a single pass through the site, and may determine the number of batched tasks to generate (at 504) based on the fewest number of agents that are needed to retrieve all objects of the received (at 502) set of orders.

FIG. 5 illustrates controller 101 generating (at 504) two batched tasks 501 and 503 when two agents 103-1 and 103-2 are available and third agent 103-3 is unavailable, or when two agents 103 are determined to be the minimum number of agents 103 required to retrieve the six ordered objects. FIG. 5 also illustrates controller 101 generating (at 504) third batched task 505 when three agents 103 are available or are the minimum number of agents 103 required to retrieve the seven ordered objects of the four received orders. Controller 101 may determine agent availability by controlling the operations that are performed by each agent 103, tracking movements and/or operations of each agent 103, and/or exchanging wireless messaging with each agent 103 to indicate the availability and/or other state of each agent 103.

To generate (at 504) the two batched tasks, controller 101 may determine (at 506) the two orders from the set of four orders that are furthest apart in the site. Controller 101 may perform a lookup within the computed distance matrix 400 to determine distances between the objects of different orders, and may compute the sum of the maximum distance between objects of different orders in order to determine (at 506) the two orders that are furthest apart in the site. Controller 101 may allocate (at 508) a different one of the two most distant orders to a different batched task. For instance, controller 101 may allocate (at 508) objects "D" and "A" of the first order to first batched task 501, and object "F" of the fourth order to second batched task 503. Allocating (at 508) an order to a batched task may include entering the storage location, object identifier, or storage location identifier for each object of the order as a node in a linked list or other data structure of the batched task.

To generate (at 504) the three batched tasks, controller 101 may determine (at 510) the three orders from the set of four orders that are furthest apart in the site based on the sum of the maximum distance between objects of the orders, and selecting the three orders with the greatest total sum of the maximum distance. Controller 101 may determine (at 510) that the first order for objects "D" and "A", the third order for objects "C" and "G", and the fourth order for object "F" correspond to the three orders from the received (at 502) set of four orders with the largest separation between them. Accordingly, controller 101 may generate (at 504) three batched tasks 501, 503, and 505, and may allocate (at 512) objects "D" and "A" of the first order to first batched task 501, objects "C" and "G" of the third order to second batched task 503, and object "F" of the fourth order to third batched task 505.

Figure 6:
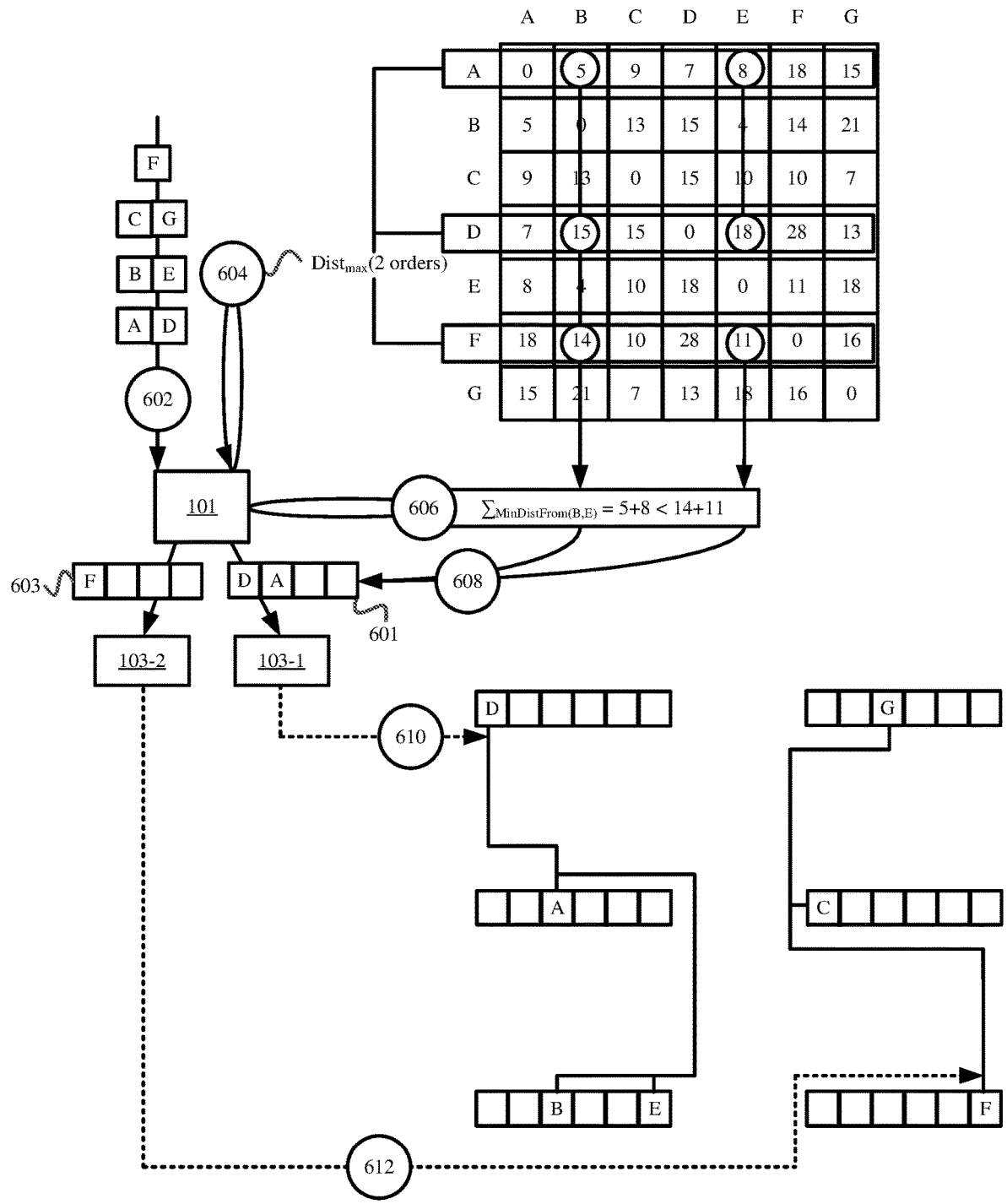
FIG. 6 illustrates an example of performing spatial batching for two generated batched tasks in accordance with some embodiments presented herein.

Once the batched tasks are generated and allocated a first order, controller 101 may complete the spatial batching by allocating the remaining unallocated orders to one of the generated batched tasks in a manner that minimizes the total distance between the ordered objects and/or that minimizes the total work performed by agents 103 in order to fulfill all orders. FIG. 6 illustrates an example of completing the spatial batching for two generated batched tasks in accordance with some embodiments presented herein.

As shown in FIG. 6, controller 101 may receive (at 602) four orders, and may generate two batched tasks 601 and 603 to efficiently fulfill the four orders using available agents 103-1 and 103-2. The four orders may include a first order for objects "A" and "D", a second order for objects "B" and "E", a third order for objects "C" and "G", and a fourth order for object "F". The objects of the four orders may be stored at different locations within the site.

Controller 101 may determine distances between objects of different pairs of orders (e.g., the first order and the second order, the first order and the third order, the first order and the fourth order, the second order and the third order, etc.). Based on the determined distances, controller 101 may compute the sum of the maximum distance between each pair of orders, and may determine (at 604) that the first order and the fourth order correspond to the two orders from the different pairings of the four orders that have the largest cumulative or maximum distance between them. Accordingly, controller 101 may allocate objects "A" and "D" of the first order to first batched task 601, and may allocate object "F" of the fourth order to second batched task 603.

Controller 101 may randomly select the second order as an unallocated order for allocation to one of batched tasks 601 and 603. Controller 101 may compute the sum of the minimum distance between objects "B" and "E" of the second order and objects allocated to each of first batched task 601 (e.g., objects "A" and "D" of the first order) and second batched task 603 (e.g., object "F" of the fourth order). Controller 101 may determine (at 606) that the sum of the minimum distance between the objects of the selected second order and one or more objects allocated to first batched task 601 is less than the sum of the minimum distance between the objects of the unallocated second order and one or more objects allocated to second batched task 603. Accordingly, controller 101 may allocate (at 608) the objects of the second order to first batched task 601, and may define a retrieval sequence that minimizes the total distance for retrieving objects "A", "B", "D", and "E" of the first order and the second order allocated to first batched task

601. For instance, controller 101 may define first batched task 601 to include a sequential retrieval of objects "D", "A", "E", and "B".

Controller 101 may randomly select a next unallocated order for allocation to one of the batched tasks. Specifically, controller 101 may select third order with objects "C" and "G" as the last unallocated order from the received set of orders, and may compute the sum of the minimum distance between the third order objects and the allocated objects to first batched task 601 and second batched task 603. Controller 101 may determine that the computed sum of the minimum distance between the objects of the selected third order and one or more objects allocated to first batched task 601 is less than the computed sum of the minimum distance between the objects of the unallocated third order and one or more objects allocated to second batched task 603. However, controller 101 may determine that first batched task 601 has reached a full state of two allocated orders or four allocated objects based on the prior allocation of the second order to first batched task 601. Accordingly, controller 101 may allocate the objects of the third order to second batched task 603, and may define a retrieval sequence that minimizes the total distance for retrieving objects "F", "C", and "G" of the fourth order and the third order allocated to second batched task 603.

Controller 101 may assign first batched task 601 to first agent 103-1, and may assign second batched task 603 to second agent 103-2. Controller 101 may control (at 610) the operation of each agent 103 based on the out-of-order and minimum distance sequential retrieval ordering defined in the assigned batched tasks 601 and 603. For instance, controller 101 may control (at 610) first agent 103-1 by moving first agent 103-1 to the storage location of object "D", retrieving object "D" using a retriever of first agent 103-1, moving first agent 103-1 to the storage location of object "A", retrieving object "A" using the retriever, moving first agent 103-1 to the storage location of object "E", retrieving object "E" using the retriever, moving first agent 103-1 to the storage location of object "B", and retrieving object "B" using the retriever. Similarly, controller 101 may control (at 612) second agent 103-2 by directing second agent 103-2 to the storage locations of objects "F", "C", and "G" via messaging provided to a device of second agent 103-2 and/or updating of an interface on the device, and by tracking the retrieval of each of objects "F", "C", and "G" based on sensor output obtained from the device of second agent 103-2.

Figure 7:
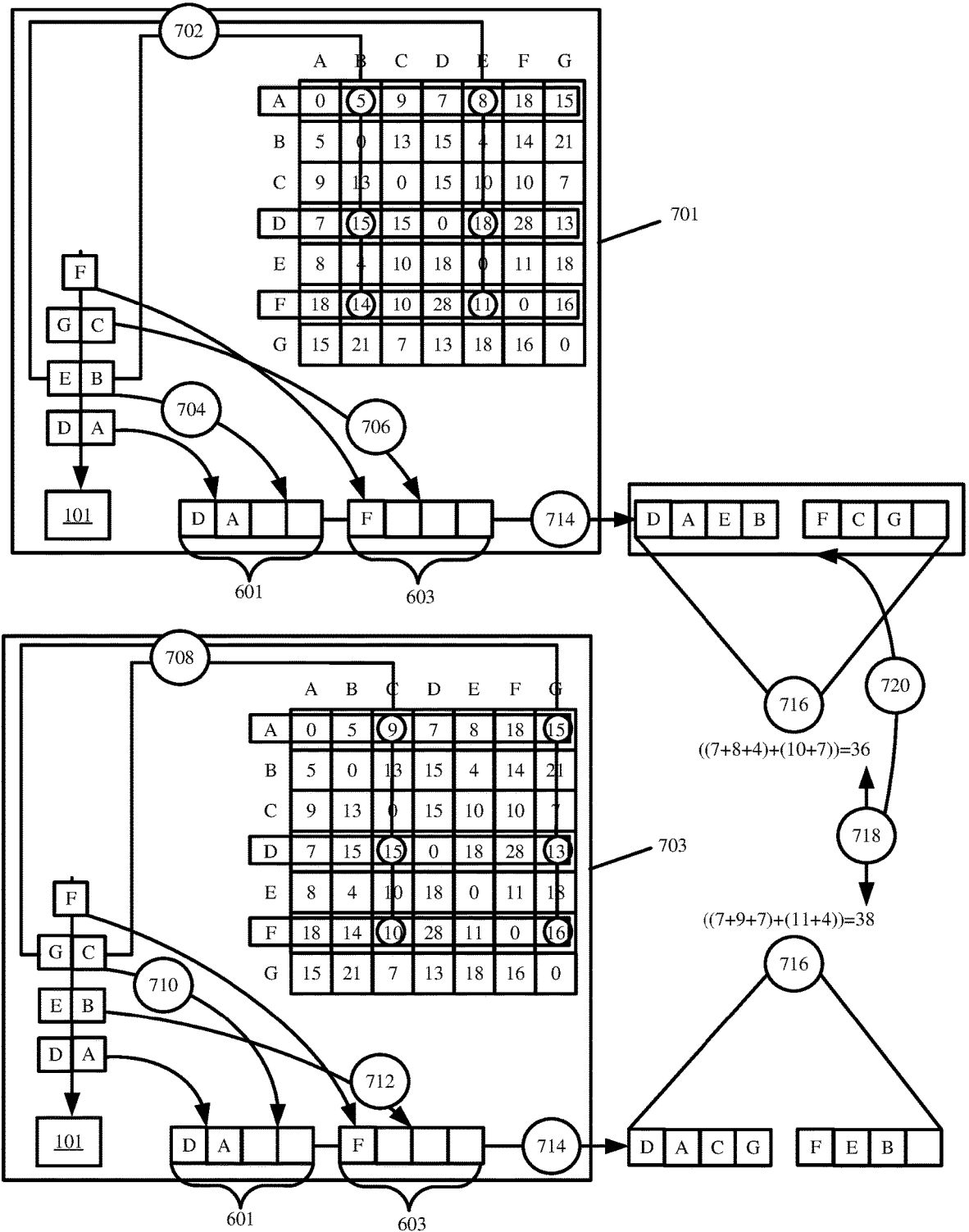
FIG. 7 illustrates an example of a controller optimizing the generated batched tasks in accordance with some embodiments.

FIG. 7 illustrates an example of controller 101 optimizing the generated batched tasks in accordance with some embodiments. As shown in FIG. 7, controller 101 performs two spatial batching passes to produce different allocations of four orders to batched tasks 601 and 603. As before, controller 101 may determine that the first order with objects "D" and "A" and the fourth order with object "F" have the greatest distance between them, and may allocate the first order to first batched task 601 and the fourth order to second batched task 603.

During first spatial batching pass 701, controller 101 may begin the spatial batching allocation by first selecting (at 702) unallocated second order with objects "B" and "E", and comparing the distance between the objects of the second order and each allocated object in first batched task 601 (e.g., objects "D" and "A") and each allocated object in second batched task 603 (e.g., object "F"). As in FIG. 6, controller 101 may determine that the sum of the minimum distance between the objects of the selected second order and one or more objects allocated to first batched task 601 is less than the sum of the minimum distance between the objects of the unallocated second order and one or more objects allocated to second batched task 603, and may allocate (at 704) objects "B" and "E" to first batched task 601. First batch task 601 may reach a full state after being allocated four objects (e.g., objects "D", "A", "B", and "E"). Accordingly, controller 101 may allocate (at 706) remaining objects of the unallocated third object to second batched task 603.

At the start of second spatial batching pass 703, controller may reset batched tasks 601 and 603 so that the orders with the furthest distance (e.g., the first order and the fourth order) are allocated to batched tasks 601 and 603, and second and third orders remain as unallocated orders. During second spatial batching pass 703, controller 101 may begin the spatial batching allocation by selecting (at 708) unallocated third order before unallocated second order. Controller 101 may compare the distance between objects "C" and "G" of the third order and each allocated object in first batched task 601 (e.g., objects "D" and "A") and each allocated object in second batched task 603 (e.g., object "F"). Controller 101 may determine that objects "C" and "G" are closest to objects "A" and "D" respectively in first batched task 601 than any object in second batched task 603, and may allocate (at 710) objects "C" and "G" of the third order to first batched task 601. First batch task 601 may reach a full state after being allocated four objects (e.g., objects "D", "A", "C", and "G"). Accordingly, controller 101 may allocate (at 712) objects of the remaining unallocated second object to second batched task 603.

Controller 101 may define (at 714) a sequence that minimizes the total distance for retrieving each of the objects allocated to first batched task 601 and second batched task 603 during the first pass 701 and second pass 703. The sequencing may specify retrieving objects "D", "A", "E", and "B" with first batched task 601 during first pass 701, retrieving objects "F", "C", and "G" with second batched task 603 during first pass 701, retrieving objects "D", "A", "C", and "G" with first batched task 601 during second pass 703, and retrieving objects "F", "E", and "B" with second batched task 603 during second pass 703. Controller 101 may compute (at 716) the sum of the minimum distance or the total distance for the defined sequence in first batched task 601 and second batched task 603 during first pass 701 and second pass 703, may compare (at 718) the total distances, and may determine that batched tasks 601 and 603 generated during first pass 701 traverse less distance and are optimized relative to batched tasks 601 and 603 generated during second pass 703. Accordingly, controller 101 may select (at 720) batched tasks 601 and 603 that are generated during first pass 701 over batched tasks 601 and 603 that are generated during second pass 703 in order to control agents 103 and fulfill the four received orders according to the batching and retrieval sequencing defined for batched tasks 601 and 603 that are generated during first pass 701.

In some embodiments, controller 101 may further optimize the batched tasks by adjusting the orders that are allocated to each batched task based on changing state of the site. Changing state information may include controller 101 receiving an updated mapping or messaging that indicates that the storage location for one of the stored objects has changed, that the ordered quantity of an object has changed, or that a new order has arrived for some of the same objects as the current set of orders.

In some embodiments, controller 101 may optimize the batched tasks based on the performance characteristics, capabilities, or aptitude of agents 103. In some such embodiments, controller 101 may track historic performance of agents 103, may determine that first agent 103-1 moves faster than second agent 103-2, and may adjust the batched tasks to retrieve more orders with first agent 103-1 than with second agent 103-2.

In some embodiments, controller 101 may optimize the batched tasks based on the properties of the ordered objects. For instance, controller 101 may determine that some of the ordered objects are large or heavy and other ordered objects are small or light. Controller 101 may further determine that first agent 103-1 is capable of retrieving heavy or large objects, and second agent 103-2 is incapable of retrieving heavy or large objects. Accordingly, controller 101 may prioritize the allocation of orders involving heavy or large objects to first agent 103-1, may prioritize the allocation of orders involving light or small objects to second agent 103-2, and may prioritize other orders based on the sum of the minimum distance computation. Controller 101 may also factor the size of the ordered objects in determining the number of objects that each agent 103 is able to retrieve in one pass through the site. For instance, agents 103 may move or carry a cart that holds ten small objects or four large objects. Controller 101 may determine the full state of a batched task based on the size of the objects that are allocated to that batched task. In doing so, controller 101 may generated unbalanced batched tasks, whereby one batched task may include more orders or objects to retrieve than another batched task because of the size and/or other properties of the objects.

In some embodiments, controller 101 may optimize the spatial batching results to minimize the potential for conflict between different agents 103. In some such embodiments, controller 101 may generate batched tasks that minimize the total distance to retrieve all ordered objects and that also maximize the distance between the storage locations of the objects in the different batched tasks. Controller may modify the retrieval sequence of objects to maximize the distance between agents 103 and/or may reallocate orders between batched tasks to better separate agents 103. For instance, two batched tasks may specify a retrieval sequence that causes two different agents 103 to cross paths or pass by one another when retrieving a last object in each retrieval sequence. Controller 101 may reverse the retrieval sequence for one of the batched tasks to avoid agents 103 from crossing paths. Alternatively, controller 101 may swap the allocated orders with objects that lead to the crossing of paths to eliminate the potential for obstacles as agents 103 perform the retrieval operations.

Figure 8:
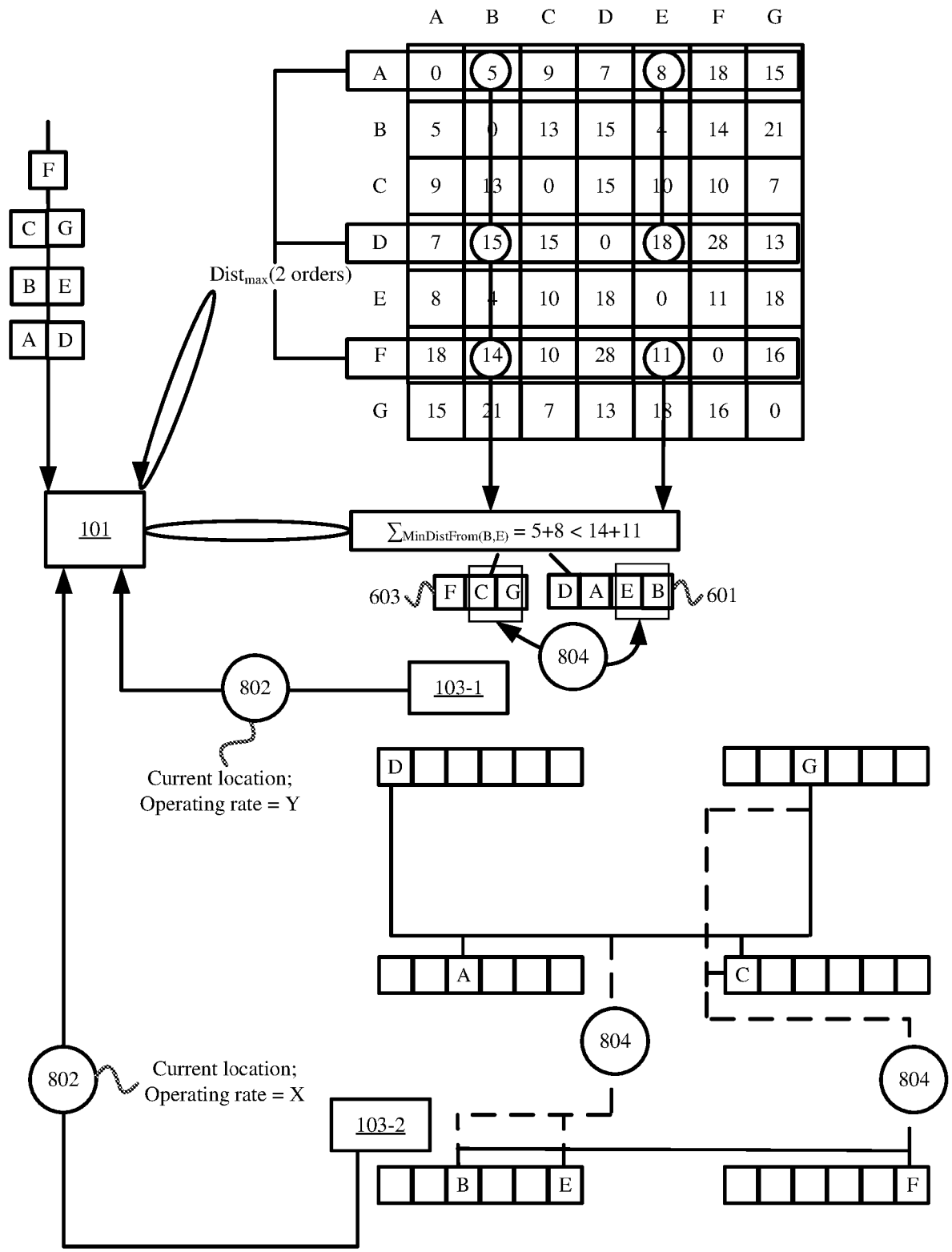
FIG. 8 illustrates an example of optimizing the spatial batching based on distance and agent characteristics in accordance with some embodiments presented herein.

FIG. 8 illustrates an example of optimizing the spatial batching based on distance and agent characteristics in accordance with some embodiments presented herein. As shown in FIG. 8, controller 101 may perform the same spatial batching as performed in FIG. 6 to generate first batched task 601 for sequential retrieval of objects "D", "A", "E", and "B", and second batched task 603 for sequential retrieval of objects "F", "C", and "G".

However, controller 101 may optimize the batched tasks based on tracked performance and current state of agents 103-1 and 103-2. For instance, controller 101 may monitor (at 802) the speed of movement and/or the speed by which agents 103 retrieved other objects within the site, and may determine that first agent 103-1 operates at a first rate and that second agent 103-2 operates at a faster second rate. Controller 101 may also track (at 802) the positioning of each agent 103 based on a Global Positioning System ("GPS") chip or geolocation sensor carried by each agent 103, or based on an estimated movement tracking. The estimated movement tracking may include receiving signaling from each agent 103 when an object is retrieved or when each agent 103 performs some other operation, determining a location associated with the retrieved object or completed operation, determining kinematics and/or performance characteristics of each agent 103, and estimating a location of each agent 103 based on a last known location, performance characteristics, and/or elapsed time since reporting of the last known location. Controller 101 may determine that second agent 103-2 is closer to object "B" despite object "B" being allocated for retrieval in first batched task 601 and controller 101 controlling first agent 103-1 to perform first batched task 601.

Controller 101 may optimize (at 804) the batched tasks by accounting for the current state and/or positioning of agents 103. For instance, controller 101 may include the position of agent 103 when computing the sum of the minimum distance for an unallocated order and/or allocating the unallocated order to one of the batched tasks. By including the positioning of agents 103 in the determination of the total distance each agent 103 travels to fulfill the orders allocated to each batched task 601 and 603, controller 101 may determine that the allocation of orders to batched tasks 601 and 603 may be optimized (at 804) by reallocating the second order with objects "B" and "E" from first batched task 601 that is assigned to first agent 103-1 to second batched task 603 that is assigned to second agent 103-2, and by reallocating the third order with objects "C" and "G" from second batched task 603 to first batched task 601. For instance, the sum of the minimum distance for the original allocation of orders to first batched task 601 and second batched task 603 when accounting for the positioning of agents 103 changes from 36 (e.g., D→A→E→B and F→C→G=(7+8+4)+(10+7)) to 53 (e.g., agent 103-1→D→A→E→B and agent 103-2→F→C→G=(2+7+8+4)+(15+10+7)), and the sum of the minimum distance for the optimized/swapped allocation of orders when accounting for the positioning of agents is 43 (e.g., agent 103-1→D→A→C→G and agent 103-2→B→E→F=(2+7+9+7)+(3+4+11)). Accordingly, the optimized allocation resulting from swapping the second order with the third order in batched tasks 601 and 603 yields a more efficient allocation of orders to agents 103 when considering the current positioning of agents 103. In other words, the optimization (at 804) made by controller 101 may reduce the total time to fulfill all orders and to complete the optimized batched tasks relative to the originally defined batched tasks.

In some embodiments, controller 101 may bias the distance calculation based on the performance characteristics of each agent 103. For instance, if second agent 103-2 moves at twice the speed of first agent 103-1, then controller 101 may halve the sum of the minimum distance that is computed for second batched task 603 assigned to second agent 103-2, and may therefore assign more orders to second batched task 603 or may adjust the order allocation so that second agent 103-2 is used to complete whichever batched task has the most distance between the assigned objects.

Figure 9:
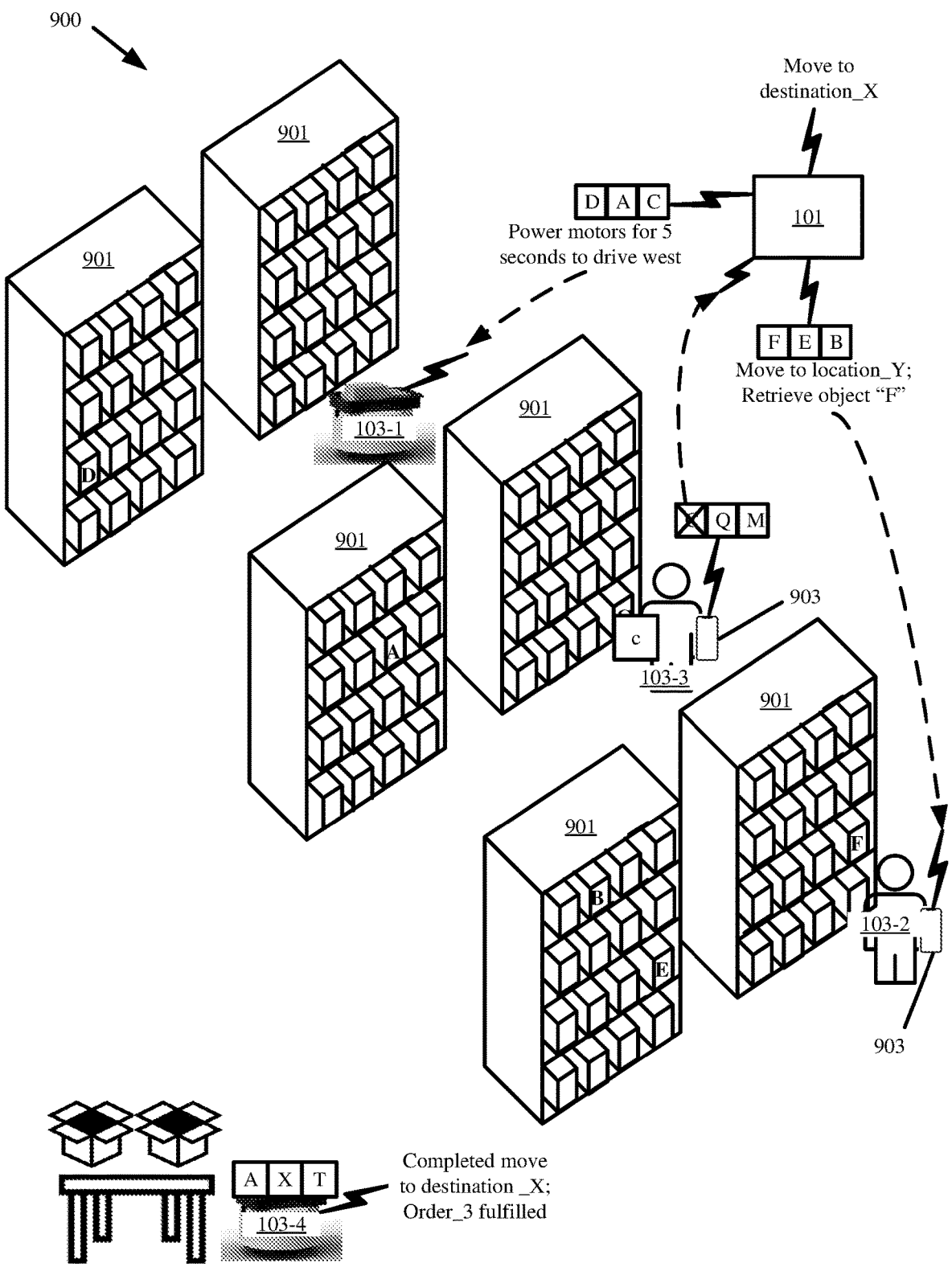
FIG. 9 illustrates an example architecture for implementing the spatial batching in accordance with some embodiments presented herein.

FIG. 9 illustrates example architecture 900 for implementing the spatial batching in accordance with some embodiments presented herein. Architecture 900 may correspond to a warehouse or other site where order fulfillment tasks are performed under direction and/or control of controller 101. The order fulfillment tasks may include object retrieval, aggregation, packaging, shipping, and/or related operations.

Architecture 900 may include different storage apparatus 901 that may be arranged in rows and/or columns. Storage apparatus 901 may include racks, shelves, bins, tables, storage slots, and/or other receptacles that may store different objects. Each storage location on a storage apparatus 901 may include a unique identifier, fiducial, or other salient queue that may be read via a scanner, camera, and/or sensor of agents 103 (e.g., agents 103-1, 103-2, 103-3, and/or 103-4) and/or devices carried by agents 103 (e.g., agents 103-1, 103-2, 103-3, and/or 103-4). Walkways, aisles, and/or other pathways may separate different sets of the storage apparatus 901, and may provide agents 103 access to storage apparatus 901.

The objects stored across storage apparatus 901 may be of different sizes, shapes, weights, and/or other characteristics. A stored object may be single unit of a particular item that is stored by itself or next to other units of the particular item. Alternatively, a stored object may be a container, bin, or tote that stores multiple units of the particular item. Each stored object may include a unique identifier, fiducial, or other salient queue that may be read via a scanner, camera, and/or sensor of agents 103 and/or devices carried by agents 103.

Controller 101 may identify which object is retrieved from which storage location based on messaging from agents 103 that provides a first identifier for the object and/or a second identifier for the storage location of the object. Controller 101 may update the state of the site, agents 103, and objects in the site based on agents 103 transmitting the object identifiers and/or storage location identifiers to controller 101.

Controller 101 may include one or more devices or systems that perform the spatial batching described herein, and that control agents 103 according to the spatial batching results. Controller 101 may be integrated as part of a warehouse management system, robotics management system, ordering system, and/or inventory control system.

Controller 101 may include one or more wireless radios to wirelessly communicate with each agent 103. In particular, controller 101 may establish a wireless network connection with each agent 103, and may transmit various network messaging to track operation and/or performance of each agent 103, assign batched tasks to agents 103, and/or control agents 103 in executing batched tasks and fulfilling orders according to the optimized out-of-order allocation of objects from different orders to different batched tasks and the optimized retrieval sequencing that is defined for the batched tasks as a result of the spatial batching.

Agents 103 may include robots with a motorized base for moving to the different object storage locations, and at least one mechanical retrieval element for retrieving and/or transferring objects from the different object storage locations to different destinations. Each robot may include a wireless module for wireless communication with controller 101. Controller 101 may control the robots by issuing commands that activate or deactivate different sensors and actuators of the robots, and/or by asserting control over the movements and operations that are performed by the robots. Agents 103 may include other mechanical or autonomous devices. For instances, agents 103 may include remote controlled forklifts, conveyor systems, aerial drones, rail-based transfer devices, and the like. Agents 103 may also include human workers with at least one device 903 that wirelessly interfaces with controller 101. Controller 101 may control the human workers via messaging exchanged with device 903, accessing the sensors of device 903, receiving data that is generated by sensors of device 903, and/or updating the device display or interface of device 903. For instance, controller 101 may access a geolocation sensor of device 903 to determine the position of a particular human worker, may obtain output from one or more sensors of device 903 that identify a storage location at which a particular object is retrieved by the particular human worker, and may provide graphical or textual instruction on the display of device 903 to direct and/or control where the human worker goes, what objects the human worker retrieves, and/or other operations that the human worker is to perform. Moreover, controller 101 may monitor performance of each agent 103 based on a first time at which agents 103 or devices 903 provide controller 101 with identifiers of a first retrieved object, a second time at which agents 103 or devices 903 provide controller 101 with identifiers of a second retrieved object, and/or the distance between the first and second objects. Additionally, controller 101 may access accelerometers, geolocation sensors, and/or other sensors of agents 103 and/or devices 903 to monitor and/or track performance of each agent 103.

It should be noted that controller 101 may simultaneously control multiple agents 103. For instance, controller 101 may receive a first object identifier and/or storage location identifier from device 903 of a first human worker in order to update a first batched task being performed by the first human worker, may provide a first salient queue to direct movements of a second human worker to a position in the site where the first salient queue associated with an object of a second batched task is found, may provide a second salient queue to control a third human worker in picking an object of a third batched task from a particular storage location, may operate a first robot in moving from a first storage location for a first object of a fourth batched task to a second storage location for a second object of the fourth batched task, and may issue a command to activate a retriever of a second robot in order to retrieve an object of a fifth batched task.

Example architecture 900 may be modified to include more, less, and/or different types of agents 103 that are under control of controller 101. For instance, controller 101 may activate, direct operation of, and/or control automated conveyor systems, packaging robots, and/or human workers at shipping stations. Controller 101 may also control packaging, shipping, sorting, inventory replenishment, and/or other tasks within the site. Accordingly, controller 101 may automated and/or optimize a variety of order fulfillment tasks that are performed in a site.

Figure 10:
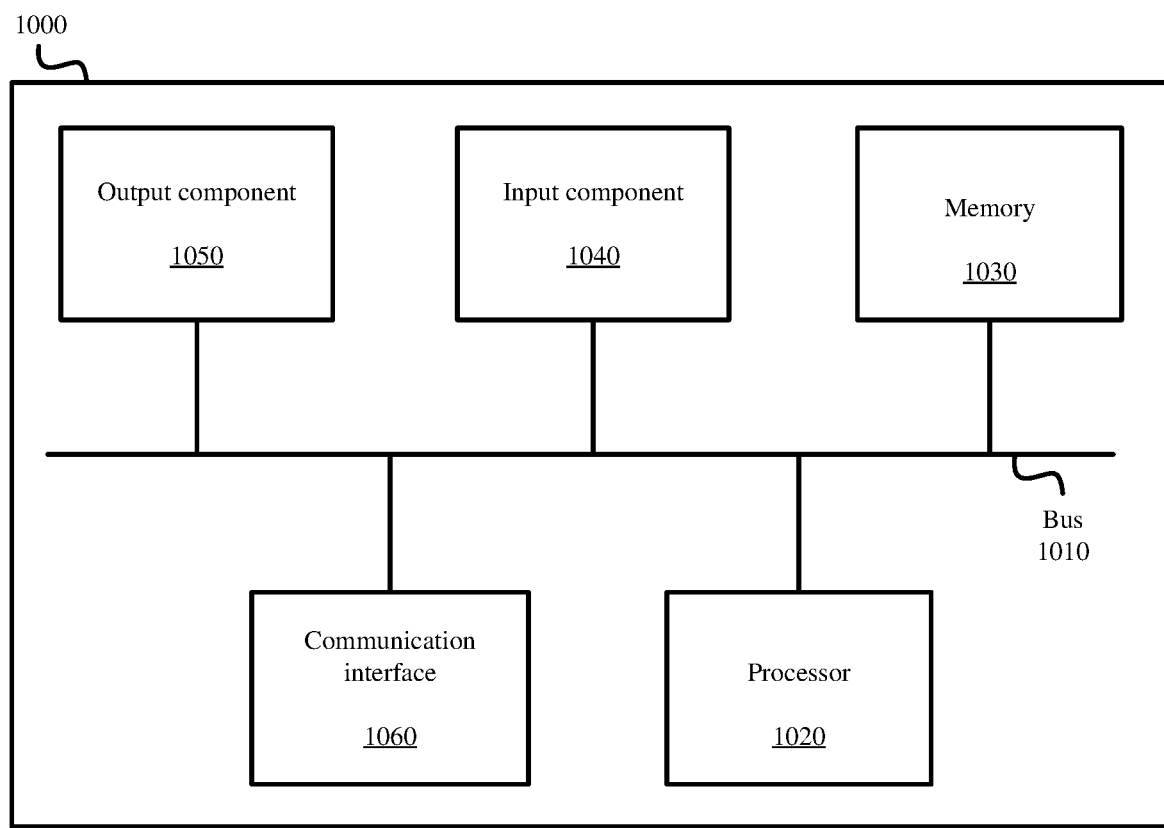
FIG. 10 illustrates example components of one or more devices, according to one or more embodiments described herein.

FIG. 10 is a diagram of example components of device 1000. Device 1000 may be used to implement one or more of the devices or systems described above (e.g., controller 101, agents 103, devices 903, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, at a controller comprising one or more processors, a plurality of orders for different objects that are stored at various storage locations in a site;
   generating, by operation of the one or more processors, a particular number of batched tasks, wherein the particular number of batched tasks is less than a number of orders in the plurality of orders;
   determining, by operation of the one or more processors, a distance between objects of a particular set of orders from the plurality of orders that is greater than a distance between objects of different sets of orders from the plurality of orders, wherein each of the particular set of orders and the different sets of orders comprises a number of orders that is equal to the particular number of batched tasks;
allocating, by operation of the one or more processors, a different order from the particular set of orders to a different batched task of the particular number of batched tasks;
selecting, by operation of the one or more processors, an unallocated order from the plurality of orders, wherein the unallocated order is not within the particular set of orders;
allocating, by operation of the one or more processors, the unallocated order from to a selected batched task of the particular number of batched tasks,
  wherein the unallocated order is allocated to the selected batched task based on a distance between two or more objects of the unallocated order and each object from a particular order of the particular set of orders that is previously allocated to the selected batched task,
  wherein the distance between the two or more objects and each object from the particular order is less than a distance between the two or more objects and each object from other orders of the particular set of orders previously allocated to other batched tasks of the particular number of batched tasks,
  wherein said allocating the unallocated order further comprises allocating the two or more objects to the selected batched task without splitting the two or more objects between different batched tasks; and
controlling, with the controller, operations of a first agent in the site according to objects from two or more orders that are allocated to a first batched task of the particular number of batched tasks, and operations of a different second agent in the site according to objects from two or more orders that are allocated to a second batched task of the particular number of batched tasks.

2. The method of claim 1 further comprising:
computing a distance between each object of the plurality of orders and every other object of the plurality of orders.

3. The method of claim 2, wherein computing the distance further comprises:
receiving a mapping that identifies a storage location of each object from the plurality of orders in the site;
quantizing the mapping to precomputed regions; and
determining a distance between a pair of objects based on the precomputed regions separating the pair of objects.

4. The method of claim 1,
wherein receiving the plurality of orders comprises receiving the different objects of the plurality of orders in a first sequence; and
wherein controlling the operations of the first agent and the second agent comprises retrieving the different objects of the plurality of orders according to a second sequence that is different than the first sequence and that is defined as part of each batched task.

5. The method of claim 1 further comprising:
modifying a sequence of orders allocated to a particular batched task of the particular number of batched tasks by changing a first sequence with which unallocated orders of the plurality of orders are selected to a second sequence.

6. The method of claim 1 further comprising:
generating a data structure that stores a distance between each pair of the different objects from the plurality of orders; and
wherein allocating the unallocated order further comprises retrieving the distance between a first object of the two or more objects from the unallocated order and a second object from the particular set of orders allocated to the particular number of batched tasks by indexing the data structure with a first identifier of the first object and a second identifier of the second object.

7. The method of claim 1,
wherein allocating the unallocated order further comprises selecting unallocated orders from the plurality of orders in a first sequence and producing a first set of batched tasks based on said selecting of the unallocated orders in the first sequence;
the method further comprising:
selecting the unallocated orders from the plurality of orders in a second sequence that is different than the first sequence;
producing a second set of batched tasks that comprises different combinations of the unallocated orders than the first set of batched tasks;
comparing a total distance resulting from the first set of batched tasks and a total distance resulting from the second set of batched tasks; and
wherein controlling the first agent and the second agent comprises controlling the first agent and the second agent according to the first set of batched tasks in response to the total distance resulting from the first set of batched tasks being less than the total distance resulting from the second set of batched tasks, and controlling the first agent and the second agent according to the second set of batched tasks in response to the total distance resulting from the first set of batched tasks being greater than the total distance resulting from the second set of batched tasks.

8. The method of claim 1 wherein controlling the operations of the first agent and the second agent comprises:
retrieving objects for a first set of the plurality of orders with the first agent under control of the controller, and retrieving objects for a different second set of the plurality of orders with the second agent under control of the controller.

9. The method of claim 1 further comprising:
computing a distance between objects of two or more orders that are allocated to a particular batched task; and
defining a modified retrieval sequence for the objects of the two or more orders that minimizes a total distance between the objects of the two or more orders based on said computing of the distance between the objects of the two or more orders.

10. The method of claim 1 further comprising:
monitoring a state of the first agent and the second agent;
wherein said controlling comprises controlling the first agent according to two or more orders allocated to the first batched task based on the state of the first agent and the state of the second agent identifying the first agent to be closer to an object of the first batched task than the second agent.

11. The method of claim 1, wherein said controlling comprises:
retrieving objects for a first set of the plurality of orders allocated to the first batched task with the first agent under control of the controller while simultaneously retrieving objects for a different second set of the plurality of orders allocated to the second batched task with the second agent under control of the controller.

12. The method of claim 1 further comprising:
   determining a number of available agents from a plurality of agents operating in the site; and
   wherein said generating comprises generating the particular number of batched tasks based on the number of available agents.
13. The method of claim 1 further comprising:
   determining a total number of objects that each agent retrieves during a single tour through the site; and
   wherein said generating comprises generating the particular number of batched tasks by determining a least number of agents for retrieving the different objects of the plurality of orders based on the total number of objects that each agent retrieves during a single tour, and wherein the particular number of batched tasks is equal to the least number of agents.
14. The method of claim 1 further comprising:
   determining a total number of objects that a particular agent retrieves during a single tour through the site; and
   setting a number of objects at which a batched task becomes full based on the total number of objects that the particular agent retrieves during a single tour through the site.
15. An order fulfillment system comprising:
   a controller with one or more processors configured to:
      receive a plurality of orders for different objects that are stored at various storage locations in a site;
      generate a particular number of batched tasks, wherein the particular number of batched tasks is less than a number of orders in the plurality of orders;
      determine a distance between objects of a particular set of orders from the plurality of orders that is greater than a distance between objects of different sets of orders from the plurality of orders, wherein each of the particular set of orders and the different sets of orders comprises a number of orders that is equal to the particular number of batched tasks;
      allocate a different order from the particular set of orders to a different batched task of the particular number of batched tasks;
      select an unallocated order from the plurality of orders, wherein the unallocated order is not within the particular set of orders;
      allocate the unallocated order to a selected batched task of the particular number of batched tasks,
      wherein the unallocated order is allocated to the selected batched task based on a distance between two or more objects of the unallocated order and each object from a particular order of the particular set of orders that is previously allocated to the selected batched task,
      wherein the distance between the two or more objects and each object from the particular order is less than a distance between the two or more objects and each object from other orders of the particular set of orders previously allocated to other batched tasks of the particular number of batched tasks,
      wherein said allocating the unallocated order further comprises allocating the two or more objects to the selected batched task without splitting the two or more objects between different batched tasks; and
      control operations of a first agent in the site according to objects from two or more orders that are allocated to a first batched task of the particular number of batched tasks, and operations of a different second agent in the site according to objects from two or more orders that are allocated to a second batched task of the particular number of batched tasks.
16. The order fulfillment system of claim 15 further comprising:
   a plurality of storage apparatus distributed across the site, each storage apparatus of the plurality of storage apparatus comprising a plurality of storage locations storing one or more of the different objects from the plurality of orders.
17. The order fulfillment system of claim 15 further comprising:
   a robot as the first agent, wherein the robot comprises a motorized base and a retriever that are operated by the controller.
18. The order fulfillment system of claim 17 further comprising:
   a wireless device that is carried on a person of a human worker, wherein the wireless device comprises one or more sensors that communicate a location of the human worker to the controller, and a display directing the operations of the second agent.
19. A non-transitory computer-readable medium, storing a plurality of processor-executable instructions to:
   receive a plurality of orders for different objects that are stored at various storage locations in a site;
   generate a particular number of batched tasks, wherein the particular number of batched tasks is less than a number of orders in the plurality of orders;
   determine a distance between objects of a particular set of orders from the plurality of orders that is greater than a distance between objects of different sets of orders from the plurality of orders, wherein each of the particular set of orders and the different sets of orders comprises a number of orders that is equal to the particular number of batched tasks;
   allocate a different order from the particular set of orders to a different batched task of the particular number of batched tasks;
   select an unallocated order from the plurality of orders, wherein the unallocated order is not within the particular set of orders;
   allocate the unallocated order to a selected batched task of the particular number of batched tasks,
   wherein the unallocated order is allocated to the selected batched task based on a distance between two or more objects of the unallocated order and each object from a particular order of the particular set of orders that is previously allocated to the selected batched task,
   wherein the distance between the two or more objects and each object from the particular order is less than a distance between the two or more objects and each object from other orders of the particular set of orders previously allocated to other batched tasks of the particular number of batched tasks,
   wherein said allocating the unallocated order further comprises allocating the two or more objects to the selected batched task without splitting the two or more objects between different batched tasks; and
   control operations of a first agent in the site according to objects from two or more orders that are allocated to a first batched task of the particular number of batched tasks, and operations of a different second agent in the site according to objects from two or more orders that are allocated to a second batched task of the particular number of batched tasks.

* * * * *